(12) United States Patent
Im et al.

(10) Patent No.: US 10,025,371 B2
(45) Date of Patent: Jul. 17, 2018

(54) METHOD AND APPARATUS FOR CONTROLLING ELECTRONIC DEVICE USING PALM TOUCH

(71) Applicant: Samsung Electronics Co., Ltd., Suwon-si, Gyeonggi-do (KR)

(72) Inventors: Yoywang Im, Suwon-si (KR); Seungnyun Kim, Incheon (KR); Huncheol Oh, Seoul (KR); Kyunghee Lee, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 543 days.

(21) Appl. No.: 14/540,556

(22) Filed: Nov. 13, 2014

(65) Prior Publication Data

US 2015/0130737 A1 May 14, 2015

(30) Foreign Application Priority Data

Nov. 13, 2013 (KR) .................... 10-2013-0137408

(51) Int. Cl.
*G06F 1/32* (2006.01)
*G06F 3/0488* (2013.01)
*G06F 3/0484* (2013.01)

(52) U.S. Cl.
CPC ........ *G06F 1/3265* (2013.01); *G06F 3/04847* (2013.01); *G06F 3/04886* (2013.01); *G06F 2203/04803* (2013.01); *Y02D 10/153* (2018.01)

(58) Field of Classification Search
CPC ......... G06F 1/3265; G06F 2203/04803; G06F 3/04847; G06F 3/04886; Y02B 60/1242; Y02D 10/153
See application file for complete search history.

(56) References Cited

U.S. PATENT DOCUMENTS

| | | | |
|---|---|---|---|
| 2011/0136479 A1 | 6/2011 | Kim et al. | |
| 2012/0019456 A1* | 1/2012 | Choi | G06F 3/04847 345/173 |
| 2013/0093680 A1* | 4/2013 | Ogita | G06F 1/1626 345/168 |
| 2013/0222338 A1* | 8/2013 | Gim | G06F 3/041 345/174 |
| 2013/0300696 A1* | 11/2013 | Haran | G06F 3/041 345/173 |
| 2014/0002396 A1* | 1/2014 | Zhao | G06F 3/041 345/173 |

(Continued)

FOREIGN PATENT DOCUMENTS

KR 10-2011-0062986 A 6/2011
KR 10-2012-0051274 A 5/2012

*Primary Examiner* — Dmitriy Bolotin
(74) *Attorney, Agent, or Firm* — Jefferson IP Law, LLP

(57) ABSTRACT

A method and an apparatus for controlling an electronic device is provided. The method and an apparatus for operating a function by detecting a touch area in which a touch is input by a user in an electronic device capable of receiving a touch input are provided. A method of controlling an electronic device includes detecting a touch inputted to the electronic device, determining whether the touch is a palm touch based on information related to the touch, and when the touch is determined to be the palm touch, controlling an output of data provided by the electronic device based on a change in a palm touch area of the palm touch.

25 Claims, 9 Drawing Sheets

(56) References Cited

U.S. PATENT DOCUMENTS

| | | | |
|---|---|---|---|
| 2014/0125629 A1* | 5/2014 | Miyamoto | G06F 3/044 345/174 |
| 2014/0139463 A1* | 5/2014 | Seo | G06F 3/0416 345/173 |
| 2014/0176456 A1* | 6/2014 | Yoon | G09G 3/3208 345/173 |
| 2014/0362046 A1* | 12/2014 | Yoshida | G06F 3/044 345/174 |
| 2015/0220118 A1* | 8/2015 | Kwak | G06F 3/14 345/667 |

* cited by examiner

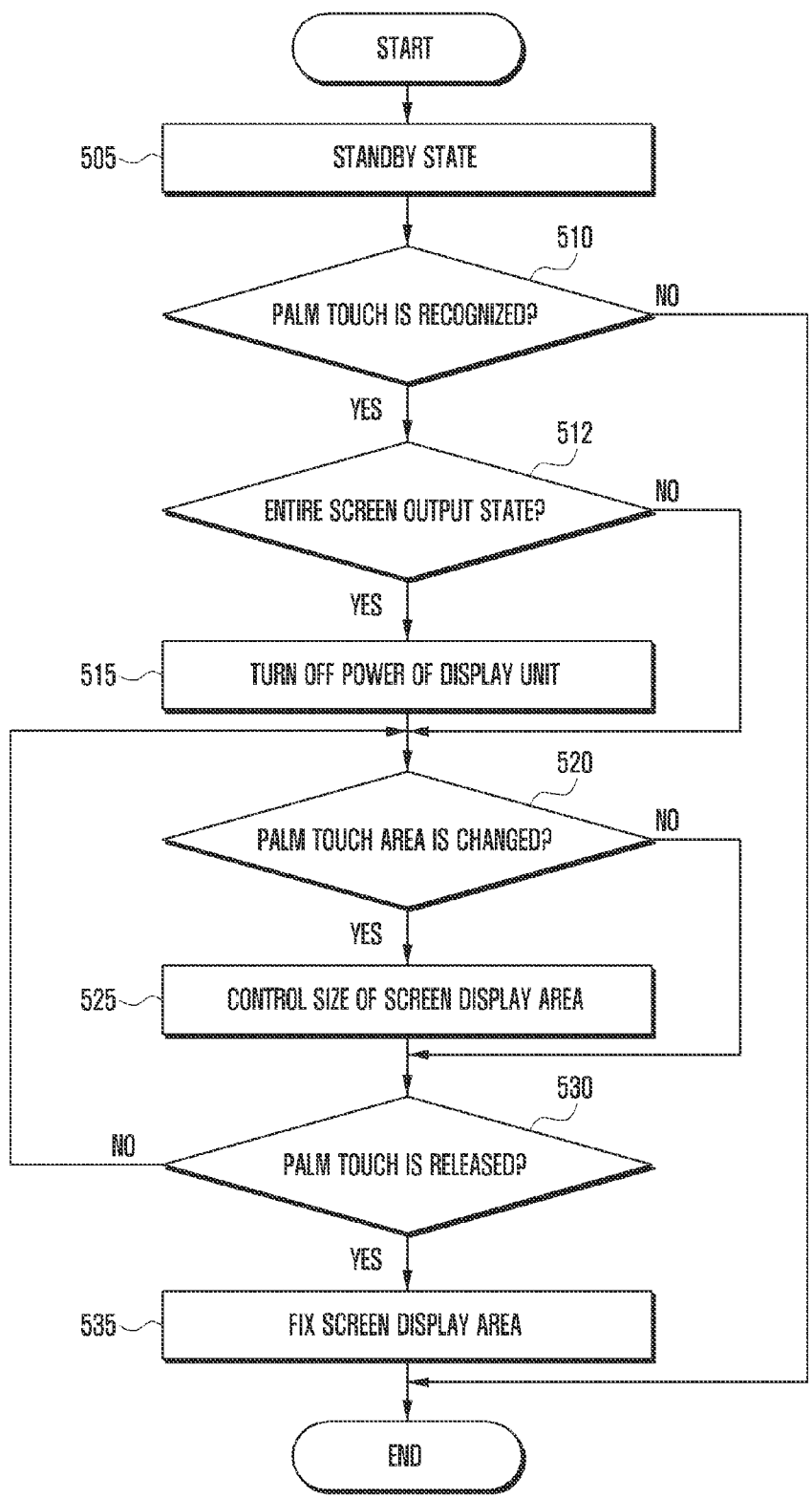

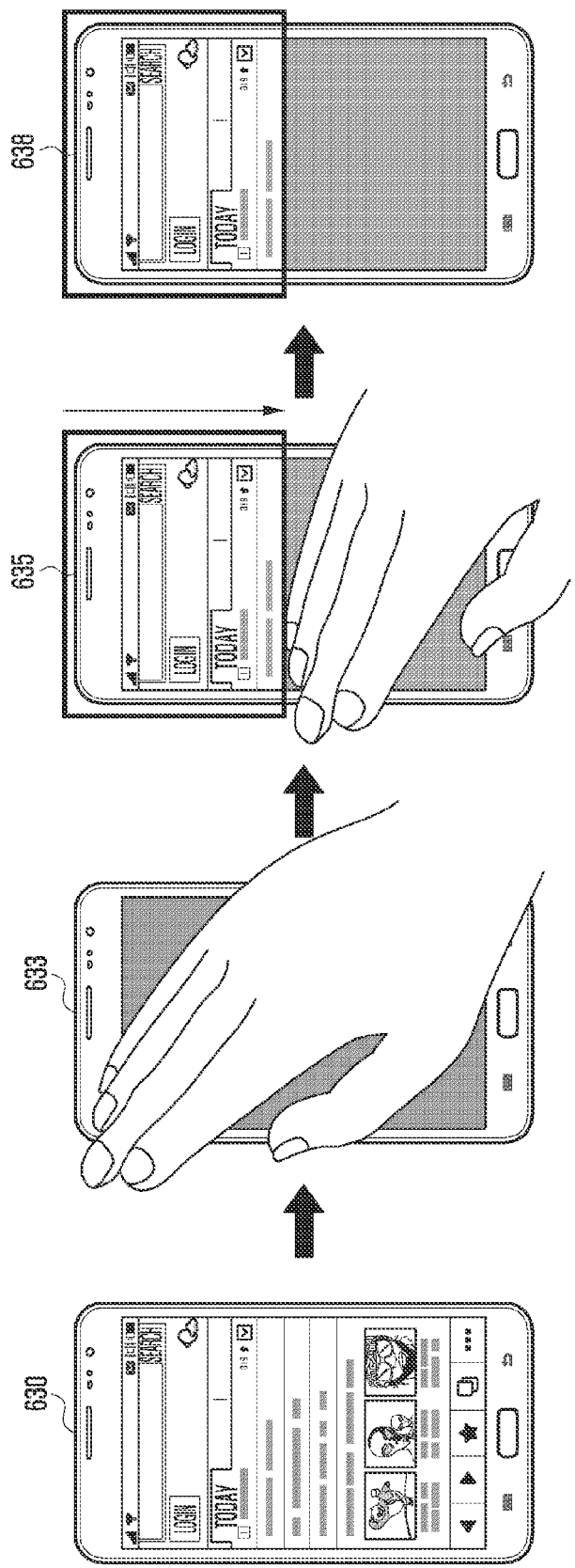

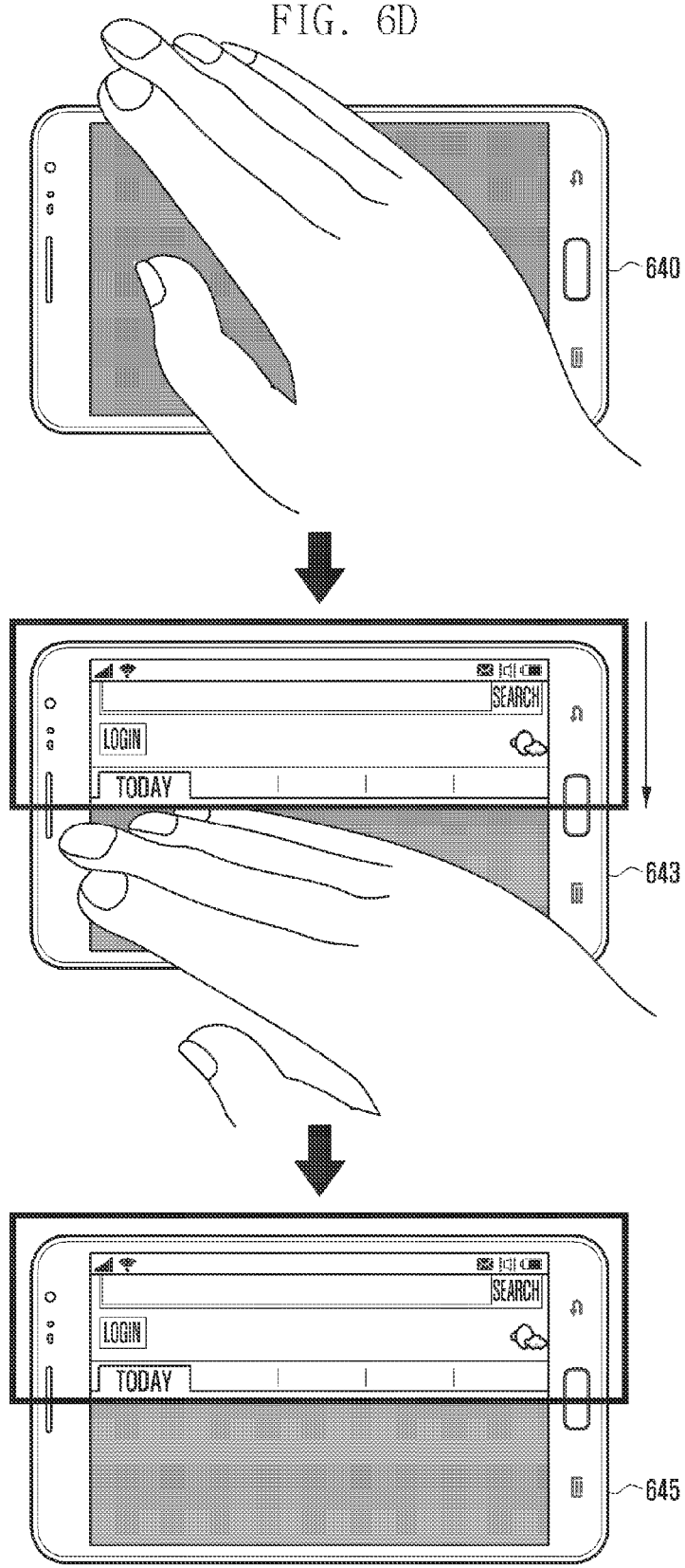

METHOD AND APPARATUS FOR CONTROLLING ELECTRONIC DEVICE USING PALM TOUCH

CROSS-REFERENCE TO RELATED APPLICATION(S)

This application claims the benefit under 35 U.S.C. § 119(a) of Korean patent application filed on Nov. 13, 2013 in the Korean Intellectual Property Office and assigned Serial number 10-2013-0137408, the entire disclosure of which is hereby incorporated by reference.

TECHNICAL FIELD

The present disclosure relates to a method and an apparatus for controlling an operation of an electronic device.

BACKGROUND

Recent electronic devices provide various functions which users need. For example, the electronic devices provide various functions, such as a call function, a multimedia play function, a broadcast reception function, an Internet access function and the like.

Meanwhile, the various functions provided by the electronic devices may sometimes inconvenience other people due to a high sound volume and a bright screen in a particular situation and place. For example, in public places such as a movie theater, the high volume bell sound may annoy other people. As described above, when the inconvenience to other people occurs, the user performs a particular key input through a method of controlling a setting value such as the volume and screen brightness in the related art. However, this operation requires time to find a key for directly controlling a setting value and is not intuitive.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure may provide a method and an apparatus for operating a function of controlling various outputs such as volume, brightness, and a screen display area by detecting a touch area generated by a user.

A user may desire to hide a screen of an electronic device from other people in order to protect privacy when performing personal tasks. For example, when the user views a screen related to personal message transmission/reception or performs a banking business requiring security, the user may desire to hide the screen of the electronic device. In such a situation, when other people approach, the user may unconsciously cover the screen of the electronic device with his/her hand or turn off power of a display unit. As a result, not only may other people not view the screen, but the user as well. Accordingly, in order to decrease the inconvenience to other people or to protect the user's privacy, current electronic devices need a method of rapidly and effectively operating a function of the electronic device.

An electronic device according to various embodiments of the present invention may provide a method and an apparatus for operating a function of controlling various outputs such as volume, brightness, and a screen display area by detecting a touch area generated by a user.

In accordance with an aspect of the present disclosure, a method of controlling an electronic device is provided. The method includes detecting a touch inputted to the electronic device, determining whether the touch is a palm touch based on information related to the touch, and when the touch is determined to be the palm touch, controlling an output of data provided by the electronic device based on a change in a palm touch area of the palm touch.

In accordance with another aspect of the present disclosure, an electronic device is provided. The electronic device includes an output unit configured to output data, a touch sensor configured to detect a touch and an area corresponding to the touch, and a controller configured to control an output of the data based on a change in a palm touch area of a palm touch.

In accordance with another aspect of the present disclosure, a computer-readable recording medium recording a program for performing a process is provided. The computer-readable recording medium includes detecting a touch inputted to an electronic device, determining whether the touch is a palm touch based on information related to the touch, and when the touch is determined to be the palm touch, controlling an output of data provided by the electronic device based on a change in a palm touch area of the palm touch.

An electronic device according to various embodiments of the present disclosure can rapidly control outputs such as volume, brightness and the like by using a palm touch without using a separate function key.

Also, an electronic device according to another embodiment of the present disclosure can rapidly control a screen display area by using a palm touch without using a separate function key and protect user's privacy.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a flowchart illustrating a method of controlling a screen display area by using a palm touch according to an embodiment of the present disclosure; and FIGS. 6A, 6B, 6C, and 6D are views for describing a method of controlling a screen display area by using a palm touch according to an embodiment of the present disclosure.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure shown and described in this specification and the drawings correspond to specific examples presented in order to easily explain technical contents of the present disclosure, and to help comprehension of the present disclosure, but are not intended to limit the scope of the present disclosure. It is obvious to those skilled in the art to which the present disclosure pertains that other modified embodiments on the basis of the spirit of the present disclosure besides the embodiments disclosed herein can be carried out.

In the following description, a palm touch may refer to a touch using a palm. When a touch is generated in an area having a value larger than or equal to a threshold corresponding to and/or related to an entire area of a touch sensor, the touch may be determined to be the palm touch.

Further, in various embodiments of the present disclosure, a setting value may refer to a value of a particular output which can be controlled within a predetermined range. For example, the setting value may correspond to screen brightness, volume and the like.

Figure 1:
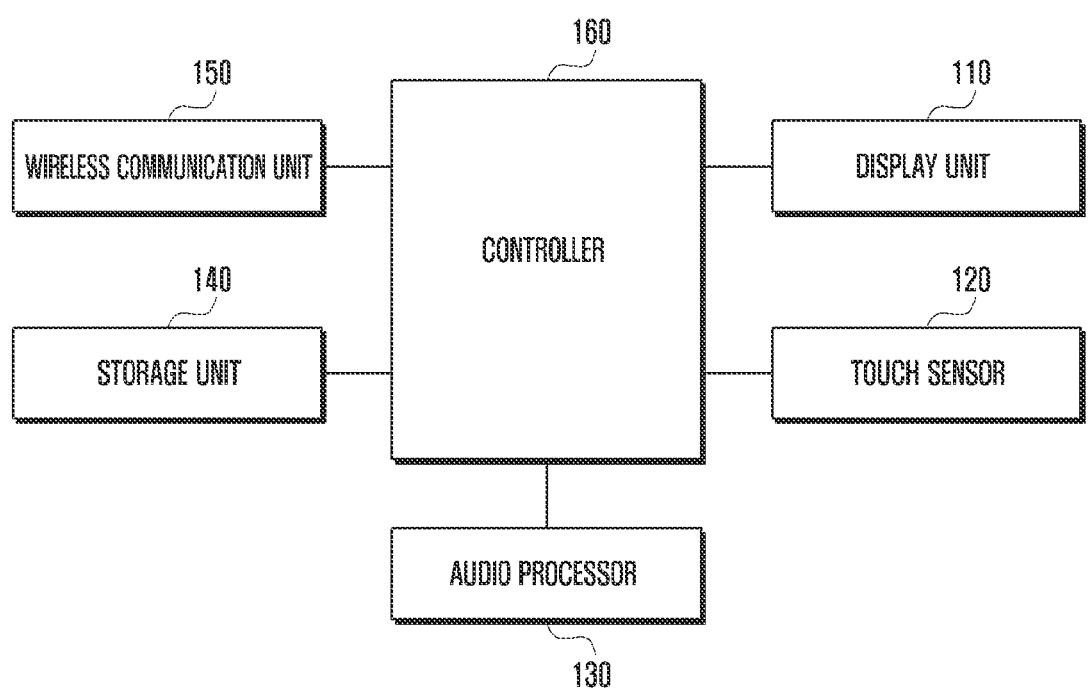
FIG. 1 illustrates a configuration of an electronic device according to an embodiment of the present disclosure.

FIG. 1 is a block diagram schematically illustrating a configuration of an electronic device according to an embodiment of the present disclosure.

Referring to FIG. 1, the electronic device according to the present disclosure may include a display unit 110, a touch sensor 120, an audio processor 130, a storage unit 140, a wireless communication unit 150, and a controller 160, and the display unit 110 and the touch sensor 120 may be integrally formed.

The display unit 110 according to various embodiments of the present disclosure may be formed by Organic Light Emitting Diodes (OLEDs) or Active Matrix Light Emitting Diodes (AMOLEDs) and may visually provide and/or display various pieces of information, such as menus of the electronic device, input data, and function setting information to a user. However, the present disclosure is not limited thereto, and the display unit 110 may be formed by any suitable and/or similar type of display device. The display unit 110 according to an embodiment of the present disclosure may display a brightness level of the entire screen as a minimum level when a palm touch is recognized under a control of the controller 160. Further, the display unit 110 may display information on a setting value, of the electronic device, which is controlled when the palm touch is made by the user. For example, the information on the setting value may include a screen brightness level, an audio data volume level and the like. Further, the display unit 110 may control the size of a display area according to a touch area. At this time, when the palm touch is made and/or detected, the display unit 110 may turn off the entire screen. In addition, the display unit 110 may change the size of the display area by maintaining a power off state of the touch area and turning on power in an area where the touch is released according to a movement of the palm touch.

The touch sensor 120 may detect a user's touch input. The touch sensor 120 may be driven according to a capacitive overlay type, a resistive overlay type, an infrared beam type and the like. In addition to these types, all types of sensors in which a contact or a pressure of an object can be detected may be used for the touch sensor 120. The touch sensor 120 detects whether a user's touch input is made and a location where the touch is made. The touch sensor 120 according to an embodiment of the present disclosure may operate regardless of a power state of the display unit 110. Further, finger touch and palm touch actions of the user may be received through the touch sensor 120.

The audio processor 130 may include a speaker (not shown) for outputting audio data received when a call is made and audio data according to the reproduction of an audio file stored in the storage unit 140, and a microphone (not shown) for collecting audio signals. For example, the audio processor 130 according to various embodiments of the present disclosure may output audio data such as a telephone ring, a morning call, and an alarm bell. In addition, the audio processor 130 outputs corresponding audio data when a video and a recorded file are reproduced, played, and/or displayed by the electronic device. Further, for example, when a palm touch is made while audio data is output, the audio processor 130 may change the volume of the output audio data to a minimum level value and output the changed volume. In addition, the audio processor 130 may control and output a volume level according to a changed amount of the touch area after the palm touch is generated.

The storage unit 140 may serve to store a program and data for the operation of the electronic device. When a user's touch is input, the storage unit 140 according to an embodiment of the present disclosure may store a command and a program for determining whether the touch input is the palm touch and a command and a program for executing an operation according to the palm touch input.

The wireless communication unit 150 may perform a wireless communication function of the electronic device. The wireless communication unit 150 may include a Radio Frequency (RF) transmitter for up-converting and amplifying a frequency of a transmission signal and an RF receiver for low-noise amplifying a received signal and down-converting a frequency. Further, the wireless communication unit 150 may include a mobile communication module such as a Long Term Evolution (LTE) module, a Code Division Multiple Access (CDMA) module, and the like, a digital broadcasting module such as a Digital Media Broadcasting (DMB) module, a Digital Video (DVB) module, and the like, a wireless Internet communication module such as a WiFi module, a Wireless Broadband (Wibro) module, and the like, and a short-range communication module such as a Near Field Communication (NFC) module, a Bluetooth module, and the like.

The wireless communication unit 150 according to an embodiment of the present disclosure may receive an incoming call. Further, the wireless communication unit 150 may support a wireless communication service to output audio data by using an audio data download, broadcast, and/or streaming service.

The controller 160 may control various operations related to general functions of the electronic device. The controller 160 according to an embodiment of the present disclosure may determine whether the touch input detected by the touch sensor 120 is a palm touch. Further, for example, when the palm touch is inputted, the controller 160 may minimize a volume level, for example, the volume level of a telephone ring, an alarm bell or the like, and a screen brightness level. The controller 160 may determine a change in a touch area after the palm touch input and may perform a control to adjust and output a sound volume level and a brightness level according to the change. In another example, the controller 160 may turn off the entire area of the display unit 110 according to the generation of the palm touch and may partially turn on the display unit 110 according to a change in the palm touch area. The controller 160 may control various operations related to general functions of the electronic device.

Hereinafter, an operation for controlling a setting value by using a palm touch in an electronic device according to an embodiment of the present disclosure will be described with reference to FIGS. 2 to 4.

Figure 2:
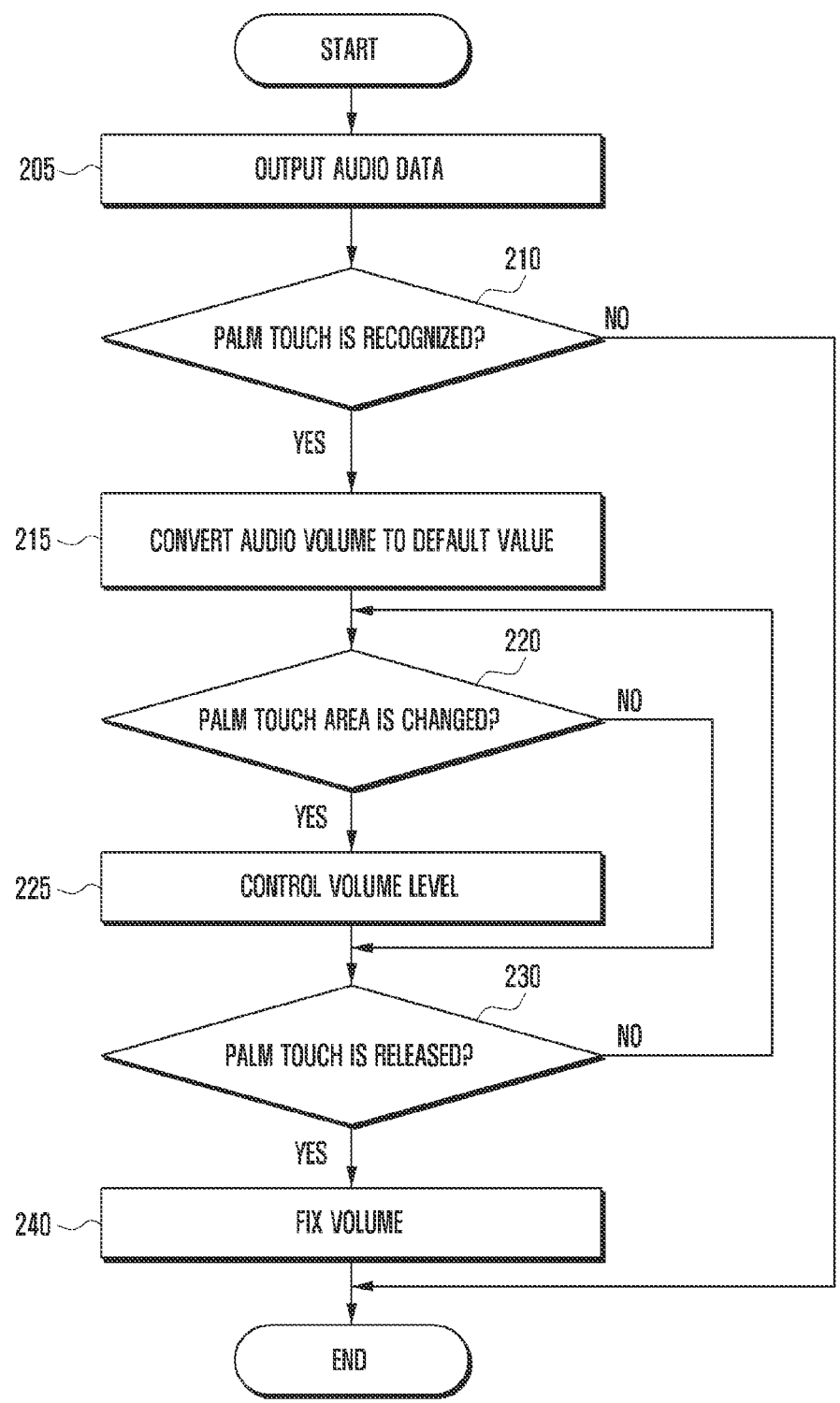
FIG. 2 is a flowchart illustrating an operation of controlling a volume level through a palm touch according to an embodiment of the present disclosure.

FIG. 2 is a flowchart illustrating an operation of controlling a volume level through a palm touch according to an embodiment of the present disclosure.

Figure 3:
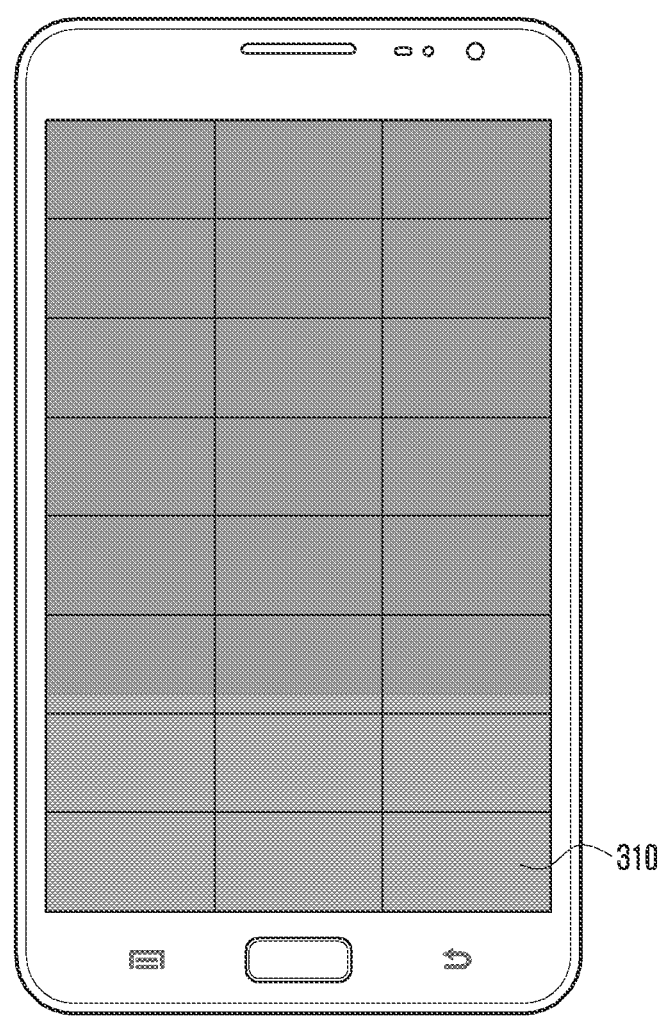
FIG. 3 illustrates a touch sensor of an electronic device according to an embodiment of the present disclosure.

FIG. 3 illustrates a touch sensor of an electronic device according to an embodiment of the present disclosure.

Figure 4:
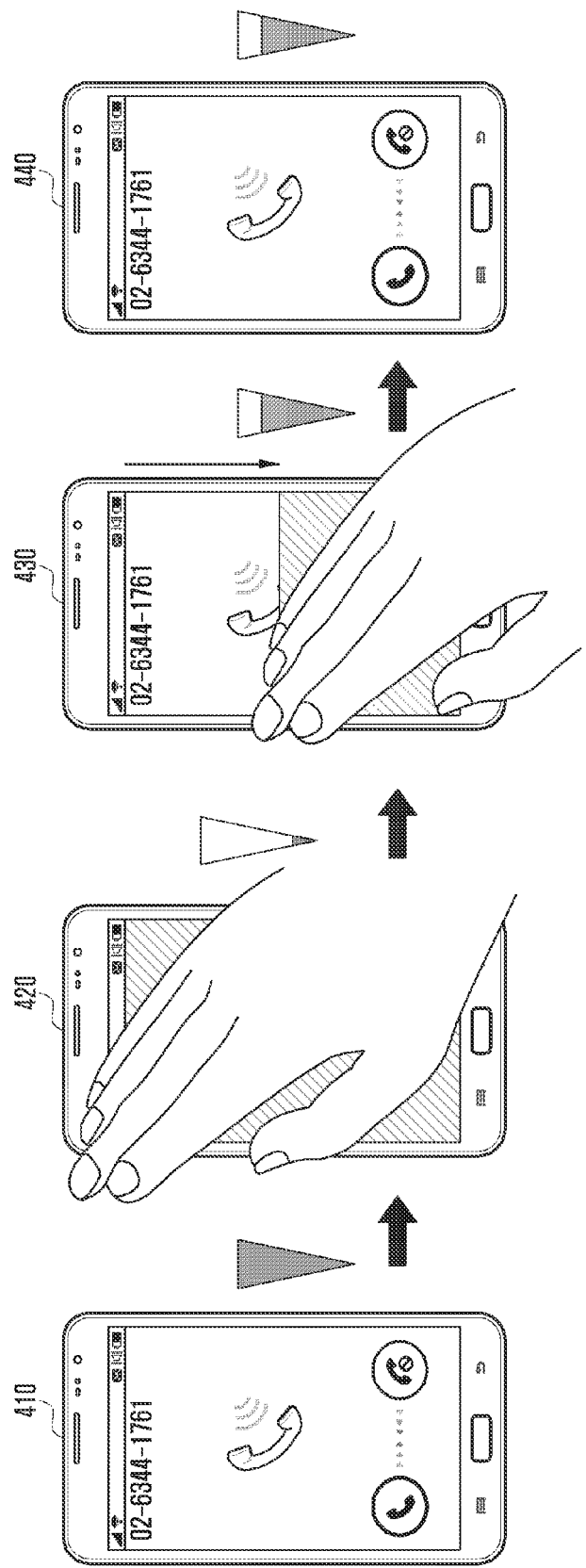
FIG. 4 illustrates an operation of controlling volume through a palm touch according to an embodiment of the present disclosure.

FIG. 4 illustrates an operation of controlling a volume through a palm touch according to an embodiment of the present disclosure.

Referring to FIGS. 2 to 4, the controller 160 may output audio data through the speaker in operation 205. For example, the operation in which the controller 160 outputs the audio data may refer to all and/or any operations of outputting audio data such as a telephone ring and outputting multimedia data, for example, video and the like, including an audio component.

The controller 160 may perform an operation of determining whether the touch sensor 120 detects the palm touch, or in other words, may determine if the palm touch is recognized in operation 210. For example, the touch sensor 120 may include a plurality of touch cells 310. When the number of touch cell areas, which may correspond to the number of touch cells 310, where the touch is detected rises above a threshold, for example, about 80% of the entirety of the plurality of touch cells 310, or more, the controller 160 may recognize the touch as the palm touch. Alternatively, when a particular number or more of particular positions are selected via a touch, the touch sensor 120 may recognize the touch as the palm touch. The touch cells 310 may be configured as illustrated in FIG. 3 and each of the plurality of touch cells 310 may be considered as a minimum unit area of the touch sensor 120 by which the generation of the touch can be recognized. According to the large or small number of the touch cells 310 detected by the touch sensor 120, the controller 160 may determine whether the touch detected by the touch sensor 120 is a palm touch. Further, the controller 160 may perform an operation of identifying whether the touch is maintained for a predetermined time, such as N seconds, during the palm touch recognition operation. For example, the controller 160 may determine whether the touch is the palm touch by identifying whether a number of the touch cells 310 in which the touch is detected is larger than or equal to a threshold and whether the touch is maintained for a predetermined time or longer.

Upon determining that the palm touch is recognized in operation 210, the controller 160 may perform an operation of changing and/or converting an audio volume to a default value in operation 215. For example, the default value may be set as a minimum value. For example, the controller 160 may change an audio volume to a minimum level, for example, level 1, and output the audio volume of level 1 in operation 215. However, operation 215 may be omitted. Alternatively, operation 215 may be performed only in a particular mode in which the audio volume is changed to the default value when the palm touch is generated in operation 215. In this case, when the palm touch is generated, a process may be added of identifying whether the electronic device is in a default value change execution mode.

The controller 160 may perform an operation of determining whether a change in a palm touch area occurs in operation 220. The controller 160 may determine the change in the palm touch area by detecting a change in the number of the touch cells 310 in which the touch is detected.

According to an embodiment, when the controller 160 determines that the change in the palm touch area has occurred in operation 220, the controller 160 may control a volume level according to the change in the palm touch area in operation 225. For example, the controller 160 may determine a threshold by which the palm touch can be recognized as a maximum value of the palm touch area and may increase a volume level in proportion to a decrease in the touch area smaller than or equal to the threshold, for example, a number of threshold touch cells. An equation of deriving a volume level by a touch area may be, for example, (volume level)=(number of threshold touch cells−number of touch cells 310 in which touch is detected)*(number of volume levels)/(number of threshold touch cells) and a derived level may use a rounded off integer. A case where the number of touch cells 310 in which the touch is detected is larger than or equal to the number of threshold touch cells or a case where there is no touch cells 310 in which the touch is detected may be considered to be exceptions. This is because, when the number of touch cells 310 in which the touch is detected is larger than or equal to the number of threshold touch cells, the controller 160 determines the touch as the palm touch and changes the level of a setting value to a minimum value. For example, in this case, the level of the setting value may be 1, which corresponds to a minimum value regardless of the number of levels. Further, when the number of touch cells 310 in which the touch is detected is 0, it means that the touch is released. When the touch is released, the controller 160 may perform an operation of fixing the level of the setting value, not an operation of controlling the setting value. In an equation of deriving a level of a setting value, a case where the number of touch cells 310 in which the touch is detected is larger than or equal to the number of threshold touch cells and a case where there is no touch cells 310 in which the touch is detected may be considered to be exceptions. For example, it is assumed that the electronic device has a threshold of 80%, the total number of touch cells 310 is 30, and the number of volume levels is 15. At this time, when the touch is detected in a number of touch cells 310 larger than or equal to 24 touch cells 310, corresponding to 80% of the 30 touch cells 310, the controller 160 of the electronic device may determine the touch as the palm touch. As described, in the detection of the palm touch, the controller 160 may set the volume to be level 1 corresponding to a minimum value.

A change in a setting value may be calculated based on the above equation according to a change in a palm touch area. When the number of touch cells 310 in which the touch is detected is changed to 23, a volume level is calculated as (24−23)*15/24=0.625 by putting 23 into the above equation and the derived value becomes 1 through rounding off. Therefore, the output volume level may be level 1. Through such a calculation equation, when the number of touch cells 310 in which the touch is detected is 20, a volume level is calculated as (24−20)*15/24=2.5 and thus output as level 3. When the number of touch cells 310 in which the touch is detected is 10, a volume level is calculated as (24−10)*15/24=8.75 and thus output as level 9. When the number of touch cells 310 in which the touch is detected 1, a volume level is calculated as (24−1)*15/24=14.375 and thus output as level 15. However, the calculation method is only an example for easily describing a volume control method according to a change in a palm touch area. When a setting value is controlled using the palm touch, the present disclosure is not limited the above calculation method.

According to another embodiment, the controller 160 may detect a direction of a change in an area where the palm touch is recognized. For example, in the volume control method, when the palm touch area is moved to an upper portion of the screen, the volume may increase. When the palm touch area is moved to a lower portion of the screen, the volume may decrease.

After operation 225, the controller 160 may perform an operation of determining whether the palm touch is released in operation 230. When the controller 160 does not recognize and/or determine the release of the palm touch, the controller 160 may perform an operation of determining whether the palm touch area is changed in operation 220. When the controller 160 recognizes the release of the palm touch in operation 230, the controller 160 may fix a volume in operation 240 and end a volume level control operation according to an embodiment of the present embodiment.

Although the operation of controlling the volume has been described with reference to FIG. 2, the controlling of the volume may be replaced with and/or controlled along with another setting value, for example, screen brightness. For example, also when the user desires to control screen brightness by using the palm touch, the controller 160 may perform the process as illustrated in FIG. 2. Hereinafter, an operation of controlling screen brightness using the palm touch will be briefly described. When the operation of controlling the screen brightness using the palm touch is performed, the operation in which the controller 160 outputs the audio data in operation 205 may be replaced with an operation of outputting image data. At this time, the operation in which the controller 160 outputs the image data may refer to all output operations performed in a state where power of the display unit 110 is turned on.

After the palm touch is recognized, the operation in which the controller 160 changes the audio volume to the default value in operation 215 may be replaced with an operation of changing the screen brightness to the default value. Similarly, the volume level control operation in operation 225 and the volume fixing operation in operation 240 may be replaced with a brightness level control operation and a brightness fixing operation, respectively. As described above, the controller 160 may differently configure the setting values to be changed in operation 205 according to the type of data. More specifically, when audio data is output, for example, outputting a telephone ring, reproducing a Motion Picture Expert Group (MPEG) Audio Layer 3 (MP3) file and the like, in operation 205, the setting value to be changed in the palm touch may be a "volume". Further, when an image file is output, for example, outputting a picture document, outputting a menu screen and the like, in operation 205, the setting value to be changed in the palm touch may be "brightness". As described above, when the palm touch is generated, the controller 160 may generally select a setting value, volume and/or brightness, to be changed based on the type of data being output.

Further, when audio data and image data are output together like a video, the controller 160 may use a user setting menu as an index of determination in order to select a setting value to be changed. When data, for example, a video, including outputs of both audio data and image data is reproduced, the user setting menu corresponds to a selection menu by which the user can directly select priorities of the setting values to be changed. For example, when the "volume" has a first priority as a target to be changed in the user setting menu, the controller 160 may select the "volume" as a setting value of the target to be changed when a palm touch is generated while a video is output. When the "brightness" has a first priority as a target to be changed in the user setting menu, the controller 160 may select the "brightness" as a setting value of the target to be changed when a palm touch is generated while a video is output. As described above, the controller 160 may select the setting value of the target to be changed, according to the priority set in the user setting menu.

Further, the controller 160 may simultaneously select setting values of the targets to be changed in the user setting menu when the palm touch is generated. When the priorities of the targets to be changed in the user setting menu are simultaneously set, the controller 160 may determine two or more setting values as targets to be changed at the same time when the palm is generated. For example, when the brightness of the screen and the volume are simultaneously selected in the user setting menu to have the priority, the controller 160 may simultaneously convert the brightness of the screen and the volume to 1 corresponding to a value of a minimum level and output the value when the palm touch is generated while the video is reproduced.

Hereinafter, a volume level control operation according to a change in a palm touch area will be described with reference to FIG. 4.

A screen 410 of FIG. 4 illustrates a situation where an electronic device displays an incoming call reception screen and also outputs a telephone ring with a maximum volume. A picture shown on a right side of the screen 410 of the electronic device indicates an audio volume level being output. The controller 160 may determine whether a palm touch is generated by detecting an area touched by the user. A screen 420 illustrates a situation where the user covers the display unit 110 of the electronic device with his/her palm to perform the palm touch. Further, the screen 420 illustrates a situation where a sound volume is minimized through the palm touch. Slashes on the screen 420 are only for indicating a touch area, but do not indicate a change in the display unit 110. For example, when audio data is output and the controller 160 recognizes generation of the palm touch, the controller 160 may only control a volume level of the audio data without any change in the display unit 110. When the controller 160 determines that, through the operation of covering the display unit 110 with the palm, the number of touch cells 310 in which the touch is detected is larger than or equal to a threshold, the controller 160 may determine the operation as the palm touch. For example, when the palm touch is detected by the electronic device, the controller 160 may convert the volume to a minimum level.

Thereafter, the controller 160 may perform an operation of identifying whether the palm touch area is changed. The change in the palm touch area is shown in screen 430. The screen 430 illustrates a situation where a palm area touching the screen of the electronic device gradually decreases. In this case, the number of touch cells in which the touch is detected by the touch sensor 120 decreases and the controller 160 may recognize the change in the palm touch area. When the controller 160 recognizes the change in the palm touch area, the controller 160 may control the volume according to the changed palm touch area.

When the volume is controlled through the change in the palm touch area as illustrated in the screen 430, the user may fix the controlled setting value by releasing the touch as illustrated in screen 440. For example, when the release of the touch is determined, the controller 160 may perform an operation of fixing and outputting a finally controlled volume.

Although the operation of changing the volume through the change in the palm touch area has been described through FIG. 4, the target to be changed is not limited to the volume. Although not illustrated, the controller 160 may control other setting values such as the screen brightness as well as the volume in the same way as the embodiment shown in FIG. 4.

Hereinafter, a method of controlling an area of the display unit by using a palm touch according to another embodiment of the present disclosure will be described with reference to FIGS. 5 to 6D. Prior to a detailed description, a method of controlling the area of the display unit by using the palm touch according to another embodiment of the present disclosure can be used by selecting a display area control mode. Further, the display area control mode may be selected and released in a user setting menu associated with the use of the palm touch. However, in the display area control mode, a setting value, such as volume or brightness, control operation performed when the palm touch is generated may be replaced with a display unit area control operation.

FIG. 5 is a flowchart illustrating a method of controlling a screen display area by using a palm touch according to an embodiment of the present disclosure.

FIGS. 6A to 6D are views for describing a method of controlling a screen display area by using a palm touch according to an embodiment of the present disclosure.

The controller 160 of the electronic device may be in a standby state in operation 505. At this time, the standby state may refer to a state where the touch sensor 120 can operate in order to recognize a palm touch regardless of a state of the display unit 110. For example, the controller 160 may maintain the standby state where the touch sensor 120 operates regardless of whether the power of the display unit 110 is on or off.

Further, the controller 160 may identify whether the palm touch is recognized in operation 510. At this time, when the number of the touch cells 310 in which the touch is detected is larger than or equal to a threshold, the controller 160 may determine the touch as the palm touch. When the palm touch is not recognized in operation 510, the controller 160 may end the operation of FIG. 5. When the palm touch is recognized in operation 510, the controller 160 may identify whether the electronic device is in an entire screen output state in operation 512. For example, the controller 160 may identify and/or determine whether the entire screen of the display unit 110 is in an on state. When the display unit 110 is determined to be in the entire screen output state in operation 512, the controller 160 may turn off power of the display unit 110 so as not to display the screen in operation 515. Operation 515 may correspond to an operation of switching data to a default value. Accordingly, operation 515 may be omitted. Alternatively, operation 515 may be performed after the controller 160 performs a process of identifying whether to switch the data to the default value. Further, the controller 160 may perform an operation of identifying and/or determining whether a palm touch area is changed in operation 520. When the display unit 110 is not in the entire screen output state in operation 512, such as when power of the display unit 110 is partially turned on or power of the display unit 110 is entirely turned off, the controller 160 may identify whether the palm touch area is changed in operation 520. Since the touch sensor 120 can operate regardless of power on/off of the display unit 110, the controller 160 may additionally detect a change in a palm touch area detected by the touch sensor 120 in a state where the display unit 110 is turned off. In other words, the controller 160 may detect the change in the palm touch area regardless of the power state of the display unit 110 in operation 520. At this time, the change in the palm touch area may be made in such a manner that the area is reduced by upwardly or downwardly moving the user's palm that is covering the screen of the electronic device. Further, the user may reduce the palm touch area by floating and/or moving a part of a finger in the air and releasing the touch in a state where the palm covers the screen of the electronic device. When the controller 160 detects the change in the palm touch area in operation 520, the controller 160 may control a display area size of the display unit 110 according to the changed area in operation 525. The display unit 110 of the electronic device may increase the screen display area along a direction in which the palm having performed the palm touch moves to reduce the touch area. When the palm covering the screen of the electronic device moves and thus, there is a case wherein only fingers are in contact with the electronic device, the screen display area may be formed in an area where the fingers are not located and boundaries of the screen display area may be formed in an area where the fingers are located. The controller 160 may identify whether the palm touch is released in operation 530. The controller 160 may perform operation 530 even when the change in the palm touch area is not identified in operation 520. When the palm touch is not released in operation 530, the controller 160 may perform operation 520 of identifying whether the palm touch area is changed. However, when the release of the palm touch is recognized in operation 530, the controller 160 may fix and output a finally controlled display area in operation 535. Thereafter, the operation of FIG. 5 may end.

Figure 6A:
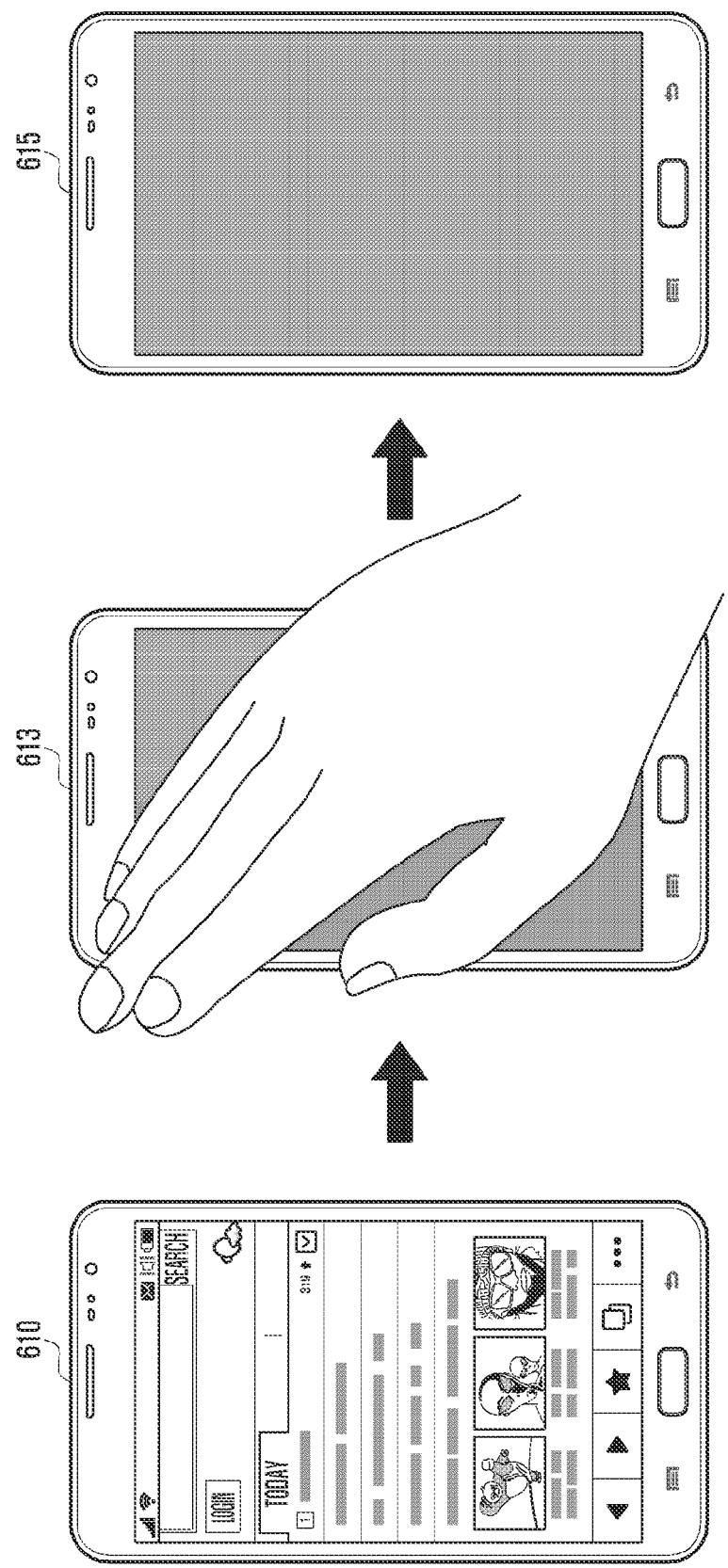

Hereinafter, the operations of FIG. 5 will be described with reference to FIGS. 6A to 6D. FIG. 6A illustrates an operation of maintaining the entirety of the display unit 110 in a dark state through a palm touch. First, a screen 610 illustrates a situation where a webpage is output on the display unit 110 in a standby state. At this time, power of the display unit 110 may be in an on state, and other graphic documents, a standby screen, and the like as well as the webpage may be output on the display unit 110. Thereafter, the controller 160 may perform an operation of identifying whether the palm touch is generated. The palm touch may be generated through an action of covering the screen of the electronic device with the palm of the user. A screen 613 illustrates a situation where the user attempts the palm touch on the electronic device. The controller 160 may determine whether the touch input by the user is the palm touch by determining whether the number of touch cells 310 in which the touch is detected is larger than or equal to a threshold. Further, when the input of the palm touch is identified, the controller 160 may perform a control to turn off power of the display unit 110 so as not to display the screen. Thereafter, when the user takes off their hand, i.e., the user moves their palm, from the screen of the electronic device, the display unit 110 may remain in a power off state as illustrated in screen 615. After the generation of the palm touch, when the palm touch is released without any change in the palm touch area, the controller 160 may fix the display area.

Figure 6B:
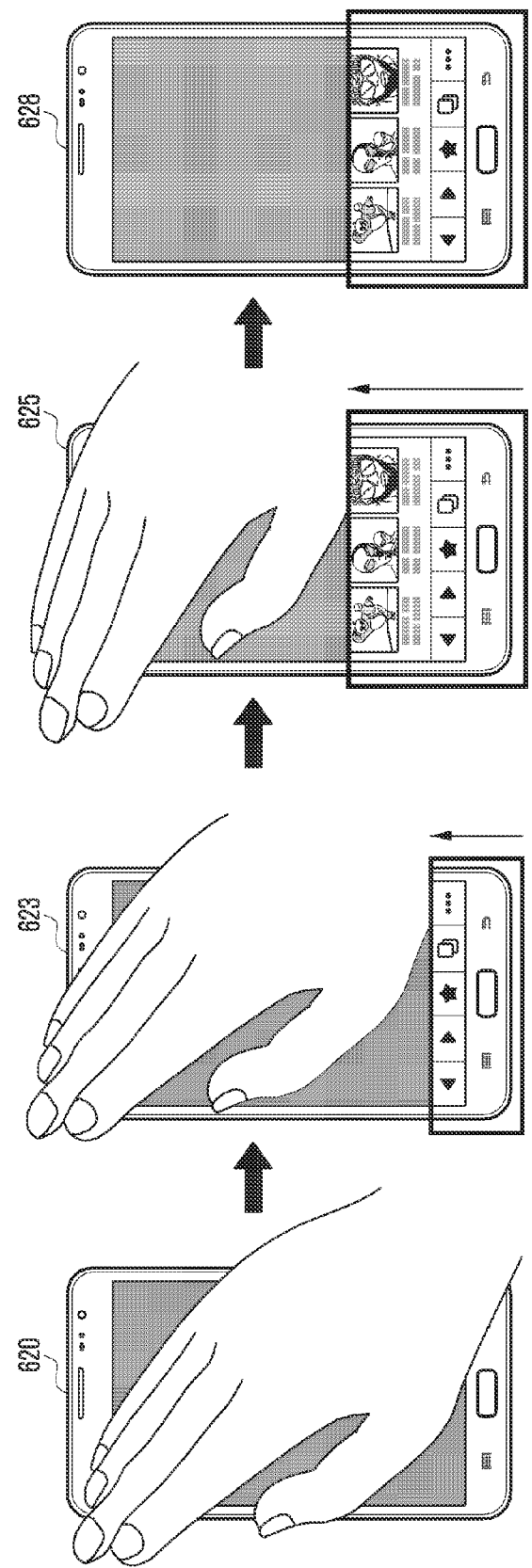

FIG. 6B illustrates an operation of controlling the screen display area by performing a palm touch in a state where the screen is dark.

A screen 620 of FIG. 6B illustrates a situation where the user inputs the palm touch again in a state where power of the display unit 110 is turned off. Since the touch sensor 120 of the electronic device can operate independently from the display unit 110, the touch sensor 120 can react to the user's touch even in a state where power of the display unit 110 is turned off. For example, even in a state where the entire screen is in an inactive state as illustrated by the screen 620 or a state where the screen is partially inactivated, the controller 160 may recognize the generation of the palm touch.

When the palm touch is recognized, the controller 160 may determine whether the display unit 110 displays the entire screen. Since the screen 620 illustrates a situation where the display unit 110 is turned off and thus the entire screen is not displayed, the controller 160 may directly determine whether the palm touch area is changed. When the user upwardly moves the palm and reduces the palm touch area as illustrated by a screen 623, the controller 160 may partially turn on power of the display unit 110 as large as the reduced area. For example, the controller 160 may determine the reduction of the palm touch area and control and output the screen display area according to the reduction. A screen 625 illustrates a situation where, after the change in the palm touch area in the screen 623, the change in the palm touch area is attempted again in a state where the touch is maintained. At this time, the controller 160 may perform the operation of determining whether palm touch area is changed again. Further, it is noted that the palm is upwardly moved again and thus a larger palm touch area is reduced in the situation illustrated by the screen 625 in comparison with the situation illustrated by the screen 623. In this case, the controller 160 may increase a size of the screen display area as large as areas where the touch is released. For example, as illustrated by the screens 623 and 625, the screen display area may have a rectangular form in which a horizontal side is fixed at a constant length and a vertical side has a variable length. At this time, a length of the horizontal side of the screen display area and a length of the horizontal side of the entire display area may be the same. However, the screen display area is not limited to a rectangle. In another embodiment of the present disclosure, the screen of the electronic device may be configured in more various forms. Further, a screen 628 illustrates a situation where, after the release of the palm touch, the screen display area is fixed. At this time, the release of the palm touch may be for fixing the screen display area. The release of the palm touch may refer to a state where no touch is detected in any touch cell of the touch sensor 120. For example, when the user completely removes the hand, i.e., the palm, from the screen of the electronic device, the controller 160 may recognize the complete touch release and partially turn off power of the display unit 110.

FIG. 6C illustrates an operation of controlling the screen display area through a palm touch.

A screen 630 of FIG. 6C illustrates a situation where the screen is output through the display unit 110. Thereafter, as illustrated by a screen 633, the palm touch may be performed. When the controller 160 recognizes the palm touch, the controller 160 may turn off total power of the display unit 110. As illustrated by a screen 635, when the user moves the palm to a lower side of the screen and thus the touch is released in an upper side of the screen, the controller 160 may partially turn on power of the upper side of the display unit 110 in which the palm touch is released. The screen 635 shows that the screen display area can be controlled from the upper side as well as from the lower side. When the user properly controls the screen display area according to a user's demand, the user may remove the palm from the electronic device as illustrated by a screen 638. In this case, the touch sensor 120 detects the release of the palm touch. At this time, the controller 160 may fix the screen display area as illustrated by the screen 638. A dark area of the screen 638 indicates some areas of the display unit 110 are in an inactive state. Further, the controller 160 may move contents, such as a webpage, an image and the like, which are displayed through the recognition of a scroll and other touch gestures generated in an area where power of the display unit 110 displaying the screen 638 is turned off, to the screen display area and display the contents.

FIG. 6D illustrates an operation of controlling the screen display area through a palm touch when an orientation of the display unit 110 is horizontal.

A screen 640 illustrates a situation where an electronic device having the display unit 110 of which power is turned off is horizontally located, i.e., the electronic device is horizontally disposed rather than vertically disposed, and a user is inputting a palm touch. In this case, the controller 160 may determine the generation of the palm touch as in operation 510 of FIG. 5. Further, a screen 643 illustrates a situation where, after the generation of the palm touch, the user moves a hand having input the palm touch to change a touch area. In this case, the controller 160 may perform a control to display the screen by partially turning on power of the display unit 110 as large as an area in which the touch is released. As illustrated by a screen 643, the display unit 110 may control the display area along the area in which the touch is released regardless of the orientation of the display unit 110, in a horizontal or vertical direction. For example, the screen display area may have a rectangular form with one side having a fixed length and another side having a variable length which can be controlled. In the screen 643, the screen display area is located in an upper portion and may have a rectangular form with a fixed horizontal side and a variable vertical side. However, the screen display area is not limited to the rectangular form and may have other various forms.

A screen 645 illustrates a situation where, when the user releases the palm touch, the screen display area which has been controlled in the screen 643 is fixed. In a case of the screen 645, the user may control the screen display area again by re-performing the palm touch. For example, the user may increase or decrease the screen display area and may return to the entire screen output state by re-performing the palm touch in the screen indicated by the screen 645.

Although the method and apparatus for operating a function using a palm touch in an electronic device according to various embodiments of the present disclosure have been described through the specification and drawings where specific terms are used, these embodiments and terms are merely used as general meanings to easily describe the technical details of the present disclosure and help the understanding of the present disclosure, and the present disclosure is not limited to the above various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling an electronic device, the method comprising:
   detecting a touch inputted to the electronic device;
   determining whether the touch is a palm touch based on information related to the touch;
   if the touch is determined to be the palm touch, determining a change in an area corresponding to the palm touch; and
   controlling a setting value of data output by the electronic device based on the change in the area corresponding to the palm touch,
   wherein the setting value of the data comprises at least one of a volume of audio data or brightness of image data.

2. The method of claim 1, wherein the determining of whether the touch is the palm touch comprises determining whether the touch is the palm touch based on an area of the touch and duration of the touch.

3. The method of claim 1, further comprising identifying whether to change the output of the data to a default value if the touch is determined to be the palm touch.

4. The method of claim 1, further comprising controlling an active area of a display unit displaying the data if the touch is determined to be the palm touch.

5. The method of claim 4, wherein the controlling of the active area comprises controlling an entire area of the display unit to be in an inactive state.

6. The method of claim 4, wherein the controlling of the active area comprises displaying the active area in a form of a rectangle with a horizontal side and a vertical side and controlling a size of the rectangle by fixing one of the horizontal side and the vertical side and varying an other of the horizontal side and the vertical side according to the change in the palm touch area.

7. The method of claim 4, wherein the controlling of the active area comprises fixing the active area based on an operation of detecting a release of the palm touch and providing data to the active area.

8. The method of claim 4, wherein the controlling of the active area comprises:
   recognizing a touch gesture in an inactive area of the display unit; and
   controlling data provision in the inactive area according to the touch gesture.

9. The method of claim 1, wherein the controlling of the setting value of the data comprises controlling a volume if the data output by the electronic device includes audio data and controlling brightness if the data output by the electronic device includes image data.

10. The method of claim 1, wherein the controlling of the setting value of the data comprises controlling the setting value of the data to a minimum value.

11. The method of claim 1,
    wherein the information related to the touch includes a number of touch cells in which a touch is detected from among an entirety of the touch cells, and
    wherein the touch cells are formed in a touch screen of the electronic device.

12. The method of claim 11, wherein the controlling of the setting value of the data comprises outputting the data according to the number of touch cells in which the touch is detected.

13. An electronic device comprising:
    an output unit configured to output data;
    a touch sensor configured to detect a touch and an area corresponding to the touch; and
    a controller configured to:
       determine whether the touch is a palm touch based on information related to the touch,
       determine a change in an area corresponding to the palm touch if the touch is determined to be the palm touch, and
       control a setting value of the data based on the change in the area corresponding to the palm touch,
    wherein the setting value of the data comprises at least one of a volume of audio data or brightness of image data.

14. The electronic device of claim 13, wherein the controller is further configured to determine whether the detected touch is a palm touch based on the area corresponding to the touch and duration of the touch.

15. The electronic device of claim 13, wherein the controller is further configured to control an active area of the display unit displaying the data.

16. The electronic device of claim 15, wherein, if the detected touch is determined to be the palm touch, the controller is further configured to identify whether to change the output of the data to a default value.

17. The electronic device of claim 15, wherein the controller is further configured to control an entire area of the display unit to be in an inactive state.

18. The electronic device of claim 15, wherein the controller is further configured to:
    control displaying of the active area in a form of a rectangle with a horizontal side and a vertical side, and
    control a size of the rectangle by fixing one of the horizontal side and the vertical side and varying an other of the horizontal side and the vertical side according to the change in the palm touch area.

19. The electronic device of claim 15, wherein the controller is further configured to fix the active area based on an operation of detecting a release of the palm touch and to provide data to the active area.

20. The electronic device of claim 15, wherein, if a touch gesture is recognized in an inactive area of the display unit, the controller is further configured to control data displayed in the active area according to the touch gesture.

21. The electronic device of claim 13, wherein the controller is further configured to:
    control a volume if the data output by the electronic device includes audio data, and
    control brightness if the data output by the electronic device includes image data.

22. The electronic device of claim 13, wherein the controller is further configured to control the setting value of the data to be a minimum value.

23. The electronic device of claim 13,
wherein the controller is further configured to determine whether the detected touch is a palm touch based on a number of touch cells in which the detected touch is detected from among an entirety of the touch cells, and
wherein the touch cells are formed in the touch sensor.

24. The electronic device of claim 23, wherein the controller is further configured to control the output of the data in accordance with the number of touch cells in which the touch is detected.

25. A non-transitory computer-readable recording medium recording a program for performing a process comprising:
- detecting a touch inputted to an electronic device;
- determining whether the touch is a palm touch based on information related to the touch;
- if the touch is determined to be the palm touch, determining a change in an area corresponding to the palm touch; and
- controlling a setting value of data output by the electronic device based on the change in the area corresponding to the palm touch,
- wherein the setting value of the data comprises at least one of a volume of audio data or brightness of image data.

* * * * *